Oct. 9, 1923.  
R. G. LABACHOTTE  
AUTOMATIC LOCK FOR RELEASE VALVES  
Filed Oct. 23, 1922  
1,470,173
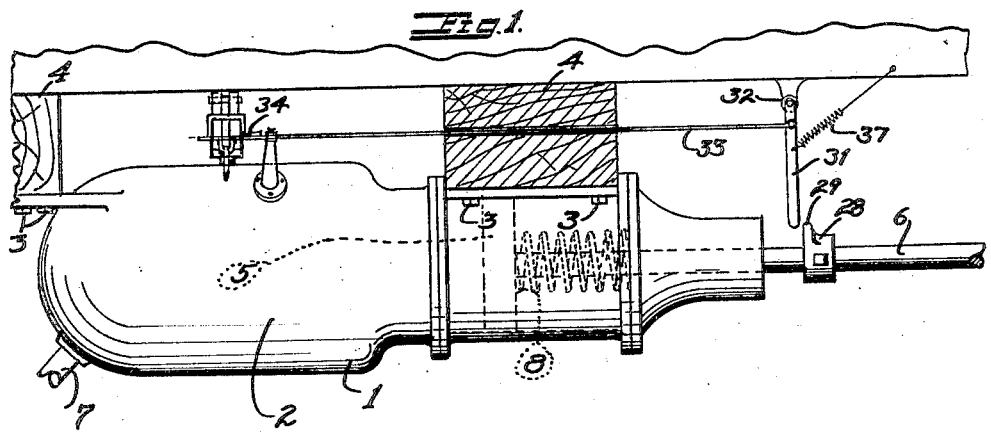
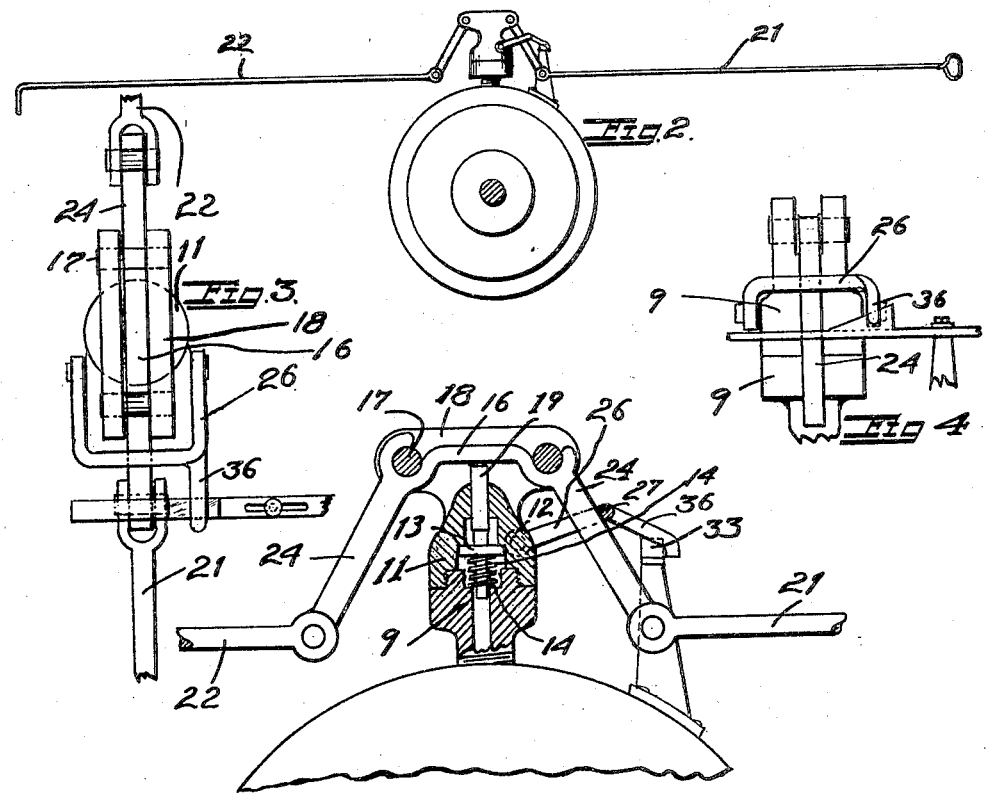
INVENTOR  
Roy G. Labachotte  
By  
ATTORNEYS.

Patented Oct. 9, 1923.

1,470,173

UNITED STATES PATENT OFFICE.

ROY G. LABACHOTTE, OF PORTERVILLE, CALIFORNIA.

AUTOMATIC LOCK FOR RELEASE VALVES.

Application filed October 23, 1922. Serial No. 596,534.

*To all whom it may concern:*

Be it known that I, ROY G. LABACHOTTE, a citizen of the United States, and a resident of Porterville, county of Tulare, State of California, have invented a new and useful Automatic Lock for Release Valves, of which the following is a specification.

The present invention relates to improvements in automatic locks for release valves or the like and is particularly designed to be used in combination with the release valve on an air brake. At the present time the release valve of a certain air brake now on the market and in common use is operated by hand and the operator is required to hold the valve open until the pressure within the cylinder of the air brake is released which usually takes considerable time, especially if the train consists of a large number of cars and the air brake on each car has to be manipulated separately. It is the object of the present invention to provide means for locking the valve in its release position so that it is only necessary for the operator to open the valve, the latter staying open thereafter, means are provided in the air brake in question for causing the piston to return as the pressure is released thru the release valve and I utilize this feature for closing the valve, after the pressure has been released. Further advantages and features of my device will appear as the specification proceeds.

The preferred form of my invention is shown in the accompanying drawing in which Figure 1 represents a side view of an air brake with a release valve thereon and my valve attachment secured thereto, Figure 2 an end view of the same, Figure 3 a top plan view of the valve mechanism and of a portion of my attachment, Figure 4 an enlarged detail view of a side elevation of the valve and my attachment and Figure 5 an enlarged detail view of a front elevation of the valve and my attachment, a portion being shown in section to show the operation of the valve mechanism. While I have shown only the preferred form of the invention I wish to have it understood that various changes or modifications may be made within the scope of the claims hereto attached without departing from the spirit of the invention.

In the air brake (1) which is well known in the art only the cylinder (2) is shown which may be secured underneath a car in any suitable manner as for instance by means of screws (3) engaging bolsters (4). A piston (5) is adapted to reciprocate in the cylinder and has the piston rod (6) secured thereto which latter is in some suitable manner not shown in the drawing operatively connected with brake shoes adapted to stop the car. The piston is actuated to travel in one direction by means of compressed air admitted through a pipe (7) and in the opposite direction by a spring (8). To allow the spring to return the piston after the brake shoes have been applied it is necessary to first release the air pressure in the back of the piston and this is done by means of the release valve (9) shown in detail in Figure 5. The latter may be of any suitable construction and is shown here as comprising a valve housing (11) forming a seat (12) for the valve (13), a spring (14) tending to seat the valve. The latter is opened by means of a horizontal bar (16) pivoted on a pin (17) supported between two lips (18) bearing down on the vertical valve stem (19) when the operator either pushes on a transverse rod (21) or pulls on a transverse rod (22) extending in the opposite direction. The two rods (21) and (22) are connected with the horizontal bar (16) through extensions (24) extending downwardly from the bar in a slanting direction.

No new features are claimed for the device thus far described, the principal object of the present invention being to provide means for holding the valve in its open position until all of the compressed air has escaped by automatic means. The latter means simply consist of a U-shaped member (26) pivoted to the valve housing (11) so that its back (27) rides on the slanting face of the extension (24). It will be seen immediately from Figure 5 that if the operator pushes on the rod (21) so as to open the valve the back of the U-shaped member (26) will ride down on the slanting face of the extension (24) and prevent the latter from returning to its closing position.

The closing of the valve is brought about as follows: As the compressed air is released the spring (8) slowly forces the piston rearwardly to release the hold of the brake shoes. A collar (28) is provided on the piston rod and the projection (29) on the same engages a lever (31) pivoted on a stationary pin (32) and actuating a horizontal rod (33)

which latter extends toward the release valve and is provided with an inclined face (34) adapted to engage a projection (36) of the U-shaped member (26) and to raise the same and with it the U-shaped member as the piston rod travels rearwardly. The raising of the U-shaped member allows the valve actuating the extension (24) to return to its original position under the influence of the spring valve (14) whereby the latter valve is closed.

The operation of the device will be readily understood from the foregoing description. When the operator passing along the train opens the release valve by either pushing on the rod (21) or pulling on the rod (22) the U-shaped member (26) slides downwardly on the slanting extension (24) and thereby locks the valve in its open position. The compressed air escaping from the cylinder allows the spring (8) to push the piston and the piston rod rearwardly and during this rearward travel the projection (29) on the collar (28) engages the lever (31) and pushes the rod (33) and its inclined face (34) underneath the projection (36) thereby lifting the U-shaped member to its former position and allowing the extension (24) of the bar (16) to return to its original position. At this time the projection (29) trips the end of the lever (31) and the latter is returned to its original position by the spring (37).

I claim:

1. Self-operating locking means for a valve having an inclined link member for actuating the same comprising a pivoted member engaging the link adapted to slide down on the same when the link is operated so as to prevent its return.

2. Self-operating locking means for a valve having an inclined link member for actuating the same comprising a U-shaped member pivoted to the valve so as to pass around the link adapted to slide down on the same when the link is operated so as to prevent its return.

3. In an air brake of the character described, a pressure-operated piston, a pressure release valve allowing the piston to return when opened having an inclined link member for actuating the same and self-operating locking means for the opened valve comprising a pivoted member engaging the link adapted to slide down on the same when the link is operated so as to prevent its return.

4. In an air brake of the character described, a pressure-operated piston, a pressure release valve allowing the piston to return when opened having an inclined link member for actuating the same, self-operating locking means for the opened valve comprising a pivoted member engaging the link adapted to slide down on the same when the link is operated so as to prevent its return and means actuated by the returning piston for lifting the pivoted member out of its locking position.

5. In an air brake of the character described, a pressure-operated piston, a pressure release valve allowing the piston to return when opened having an inclined link member for actuating the same, self-operating locking means for the opened valve comprising a pivoted member engaging the link adapted to slide down on the same when the link is operated so as to prevent its return, and a member having an inclined plane thereon adapted to be actuated by the returning piston for lifting the pivoted member out of its locking position.

6. In an air brake of the character described, a pressure-operated piston, a pressure release valve allowing the piston to return when opened having an inclined link member for actuating the same, self-operating locking means for the opened valve comprising a U-shaped member pivoted to the valve so as to pass around the link adapted to slide down on the same when the link is operated so as to prevent its return and means actuated by the returning piston for lifting the U-shaped member out of its locking position.

7. In an air brake of the character described, a pressure-operated piston, a pressure release valve allowing the piston to return when opened having an inclined link member for actuating the same, self-operating locking means for the opened valve comprising a U-shaped member pivoted to the valve so as to pass around the link adapted to slide down on the same when the link is operated so as to prevent its return and a member having an inclined plane thereon adapted to be actuated by the returning piston for lifting the pivoted member out of its locking position.

ROY G. LABACHOTTE.